US012696318B2

(12) United States Patent
Cheng et al.

(10) Patent No.: US 12,696,318 B2
(45) Date of Patent: Jul. 28, 2026

(54) MECHANISMS FOR RLF DETECTION OF SIDELINK ON UNLICENSED SPECTRUM

(71) Applicant: MediaTek Singapore Pte. Ltd., Singapore (SG)

(72) Inventors: Jun-Qiang Cheng, Beijing (CN); Tao Chen, Beijing (CN); Jing-Wei Chen, Hsinchu City (TW)

(73) Assignee: MediaTek Singapore Pte. Ltd., Hsinchu City (TW)

( * ) Notice: Subject to any disclaimer, the term of this patent is extended or adjusted under 35 U.S.C. 154(b) by 313 days.

(21) Appl. No.: 18/477,073

(22) Filed: Sep. 28, 2023

(65) Prior Publication Data

US 2024/0098791 A1     Mar. 21, 2024

Related U.S. Application Data

(63) Continuation of application No. PCT/CN2022/119584, filed on Sep. 19, 2022.

(30) Foreign Application Priority Data

Sep. 19, 2022   (WO) ............... PCT/CN2022/119584
Sep. 14, 2023   (CN) ......................... 202311190879.6

(51) Int. Cl.
 *H04W 4/00*      (2018.01)
 *H04W 74/0816*   (2024.01)
 *H04W 76/28*     (2018.01)

(52) U.S. Cl.
 CPC ....... *H04W 74/0816* (2013.01); *H04W 76/28* (2018.02)

(58) Field of Classification Search
 USPC ................................................. 370/329, 330
 See application file for complete search history.

(56) References Cited

U.S. PATENT DOCUMENTS

| 2021/0050953 A1* | 2/2021 | Park ...................... H04L 1/1864 |
| 2021/0058970 A1* | 2/2021 | Kwak .................... H04W 72/23 |

(Continued)

FOREIGN PATENT DOCUMENTS

| WO | WO2021235705 A1 | 11/2021 |
| WO | WO2023081108 A1 | 5/2023 |

OTHER PUBLICATIONS

European Intellectual Property Office Action 23198125.9-1215, dated Feb. 16, 2024 (14 pages).

(Continued)

*Primary Examiner* — Chuong T Ho

(74) *Attorney, Agent, or Firm* — Helen Mao; Imperium Patent Works

(57) ABSTRACT

Apparatus and methods are provided RLF detection for SL-U transceiving. In one novel aspect, HARQ-based RLF detection and/or LBT-based RLF detection is performed for SL-U RLF. HARQ based SL-U RLF procedure increases DTX for each PSSCH or PSCCH and disregards detected DTX on PSFCH or increases DTX for each PSFCH absence. In one embodiment, a DTX threshold value is modified. In one embodiment, the LBT based RLF procedure detects and reports an LBT failure for an RB set by the PHY layer; determines a consistent LBT (C-LBT) for the RB set based on a C-LBT threshold at the MAC layer and determines an RLF when all configured RB sets for the SL connection is determined to be C-LBT. In another novel aspect, multiple PSFCH occasions are configured for one PSSCH/PSCCH at a consecutive symbol level, a non-consecutive symbol level, a consecutive slot level or a non-consecutive slot level.

14 Claims, 6 Drawing Sheets

(56)      References Cited

U.S. PATENT DOCUMENTS

| | | | |
|---|---|---|---|
| 2021/0083911 A1* | 3/2021 | Morozov | ............ H04L 27/2636 |
| 2022/0201760 A1 | 6/2022 | Ozturk | |
| 2022/0272752 A1 | 8/2022 | Zhang | |
| 2023/0148141 A1* | 5/2023 | Hu | ........................ H04L 5/0053 |
| | | | 370/329 |
| 2023/0239921 A1* | 7/2023 | Kumar | .............. H04W 74/0875 |
| | | | 370/329 |
| 2024/0064775 A1* | 2/2024 | Babaei | .................. H04L 5/0094 |
| 2025/0038807 A1* | 1/2025 | Di Girolamo | ........ H04W 76/14 |
| 2025/0175953 A1* | 5/2025 | Do | ........................ H04L 1/1854 |

OTHER PUBLICATIONS

Giwonpark et al: "Stage-3 Running CR of TS 38.321 for SL Evolution".
"3rd Generation Partnership Project; Technical Specification Group Radio Access Network; NR; Medium Access Control (MAC) Protocol specification (Release 17)", 3GPP Standard; Technical Specification; 3GPP TS 38.321.

* cited by examiner

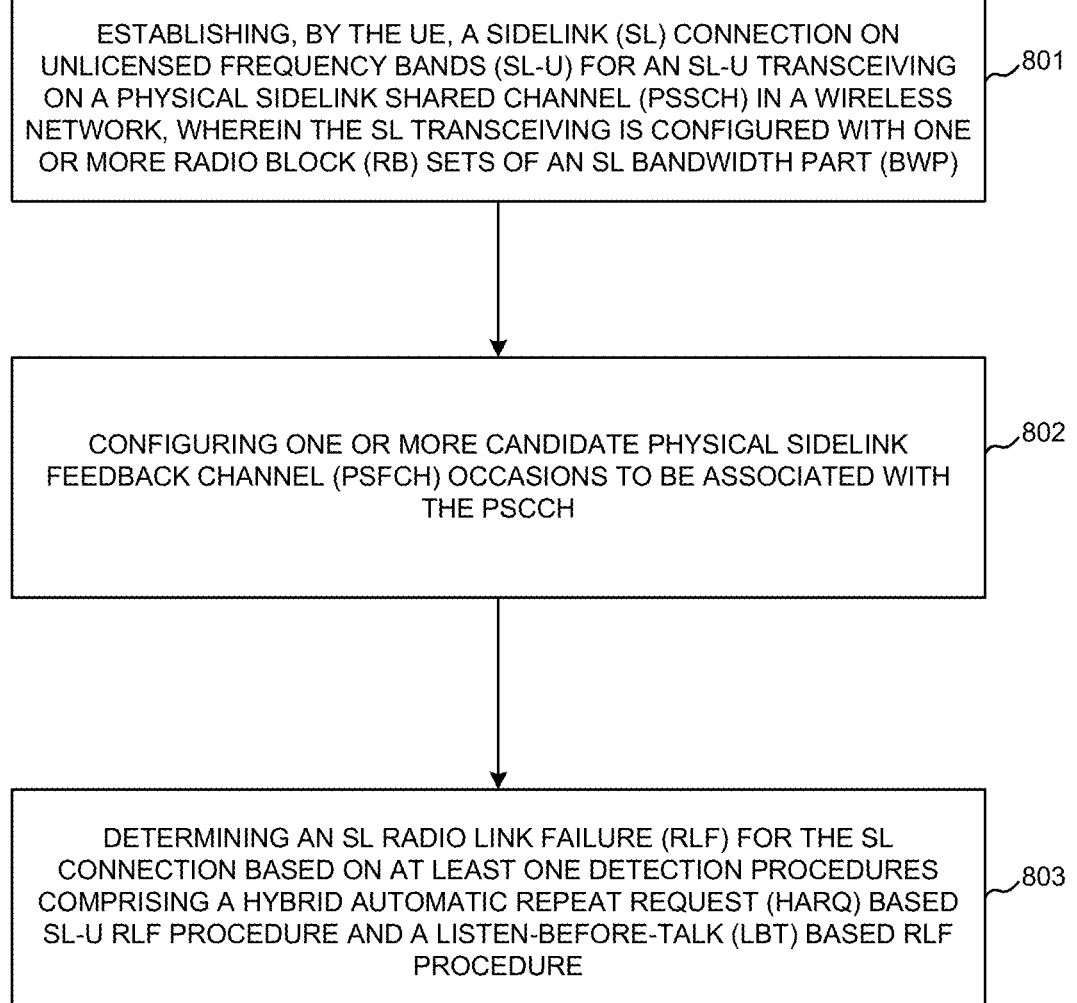

ESTABLISHING, BY THE UE, A SIDELINK (SL) CONNECTION ON UNLICENSED FREQUENCY BANDS (SL-U) FOR AN SL-U TRANSCEIVING ON A PHYSICAL SIDELINK SHARED CHANNEL (PSSCH) IN A WIRELESS NETWORK, WHEREIN THE SL TRANSCEIVING IS CONFIGURED WITH ONE OR MORE RADIO BLOCK (RB) SETS OF AN SL BANDWIDTH PART (BWP) 　801

CONFIGURING ONE OR MORE CANDIDATE PHYSICAL SIDELINK FEEDBACK CHANNEL (PSFCH) OCCASIONS TO BE ASSOCIATED WITH THE PSCCH 　802

DETERMINING AN SL RADIO LINK FAILURE (RLF) FOR THE SL CONNECTION BASED ON AT LEAST ONE DETECTION PROCEDURES COMPRISING A HYBRID AUTOMATIC REPEAT REQUEST (HARQ) BASED SL-U RLF PROCEDURE AND A LISTEN-BEFORE-TALK (LBT) BASED RLF PROCEDURE 　803

FIG. 8

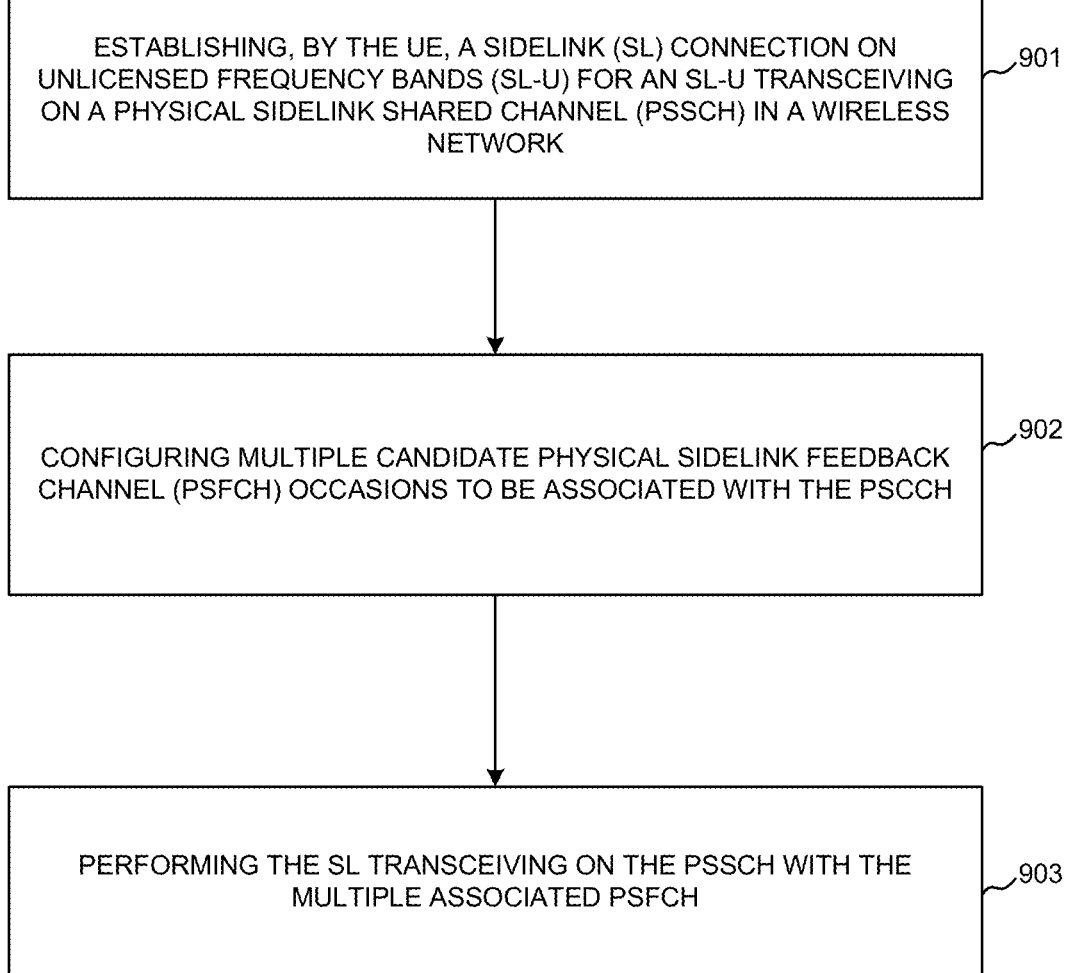

ESTABLISHING, BY THE UE, A SIDELINK (SL) CONNECTION ON UNLICENSED FREQUENCY BANDS (SL-U) FOR AN SL-U TRANSCEIVING ON A PHYSICAL SIDELINK SHARED CHANNEL (PSSCH) IN A WIRELESS NETWORK ⟋901

CONFIGURING MULTIPLE CANDIDATE PHYSICAL SIDELINK FEEDBACK CHANNEL (PSFCH) OCCASIONS TO BE ASSOCIATED WITH THE PSCCH ⟋902

PERFORMING THE SL TRANSCEIVING ON THE PSSCH WITH THE MULTIPLE ASSOCIATED PSFCH ⟋903

FIG. 9

MECHANISMS FOR RLF DETECTION OF SIDELINK ON UNLICENSED SPECTRUM

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2022/119584, titled "MECHANISMS FOR RLF DETECTION OF SIDELINK ON UNLICENSED SPECTRUM," with an international filing date of Sep. 19, 2022. This application claims priority under 35 U.S.C. § 119 from Chinese Application Number CN 202311190879.6 titled "MECHANISMS FOR RLF DETECTION OF SIDELINK ON UNLICENSED SPECTRUM" filed on Sep. 14, 2023. The disclosure of each of the foregoing documents is incorporated herein by reference.

TECHNICAL FIELD

The disclosed embodiments relate generally to wireless communication, and, more particularly, to transmission for sidelink communication on unlicensed spectrum.

BACKGROUND

Sidelink (SL) communication was introduced to enable direct transmission between two user equipment (UEs), which is also known as the device-to-device (D2D) communications. With the development of 3GPP normative works, the scenarios of sidelink are extended to UE-to-network relay, public safety, vehicle-to-everything (V2X) communications and so on. The critical role of sidelink in long term evolution (LTE) and the new radio (NR) has made it an inevitable remedy to support diverse use cases of future wireless communications.

To meet the increased demands of wireless data traffic, using unlicensed frequency bands has drawn a lot of attention in the wireless industry to improve the capacity of future wireless communication systems. The utilization of unlicensed spectrum for sidelink communications is regarded as the most promising direction for further development of sidelink communication. To occupy the unlicensed frequency bands for sidelink (SL-U) transceiving, the UE must perform channel sensing, such as listen-before-talk (LBT) procedure. The LBT procedure or channel sensing procedures are needed for SL-U. The current procedures for detecting radio link failure (RLF) is based on physical sidelink shared channel (PSSCH) and/or physical sidelink control channel (PSCCH) without factor in the LBT failure.

Improvements and enhancements are required for sidelink RLF detection for the SL-U transceiving.

SUMMARY

Apparatus and methods are provided RLF detection for SL-U transceiving. In one novel aspect, HARQ-based RLF detection and or LBT-based RLF detection is performed for the SL-U transceiving with one or more PSFCH occasions configured. In one embodiment, HARQ based SL-U RLF procedure increases DTX for each PSSCH or PSCCH and disregards detected DTX on PSFCH. In another embodiment, the HARQ based SL-U RLF procedure increases DTX for each PSFCH absence. In yet another embodiment, a DTX threshold value is modified, and wherein the DTX threshold value is a maximum number that consecutive numbers of DTX detected before triggering the SL RLF. In one embodiment, the LBT based RLF procedure detects, by a PHY layer of the UE, an LBT failure for an RB set; reports the LBT failure of the RB set to a MAC layer of the UE; determines a consistent LBT (C-LBT) for the RB set based on a C-LBT threshold, and determines an RLF for the SL connection when all configured RB sets for the SL connection is determined to be C-LBT. In one embodiment, the C-LBT threshold is preconfigured or dynamically indicated. In another embodiment, the C-LBT threshold is based on one or more factors comprising network loading, network density, channel busy ratio, and traffic quality of service (QoS), UE's supervising role, and UE member in a UE group.

In another novel aspect, multiple PSFCH occasions are configured for one PSSCH/PSCCH. The multiple PSFCH occasions are configured at a consecutive symbol level, a non-consecutive symbol level, a consecutive slot level or a non-consecutive slot level. In one embodiment, the multiple PSFCH occasions are preconfigured or dynamically indicated.

This summary does not purport to define the invention. The invention is defined by the claims.

BRIEF DESCRIPTION OF THE DRAWINGS

The accompanying drawings, where like numerals indicate like components, illustrate embodiments of the invention.

FIG. 8 illustrates an exemplary flow chart for the determining SL RLF for SL transceiving on SL-U with HARQ-based RLF procedure and/or LBT-based procedure in accordance with embodiments of the current invention.

FIG. 9 illustrates an exemplary flow chart for configuring multiple PSFCH occasions for PSSCH/PSCCH for SL transceiving on SL-U in accordance with embodiments of the current invention.

DETAILED DESCRIPTION

Reference will now be made in detail to some embodiments of the invention, examples of which are illustrated in the accompanying drawings.

Figure 1:
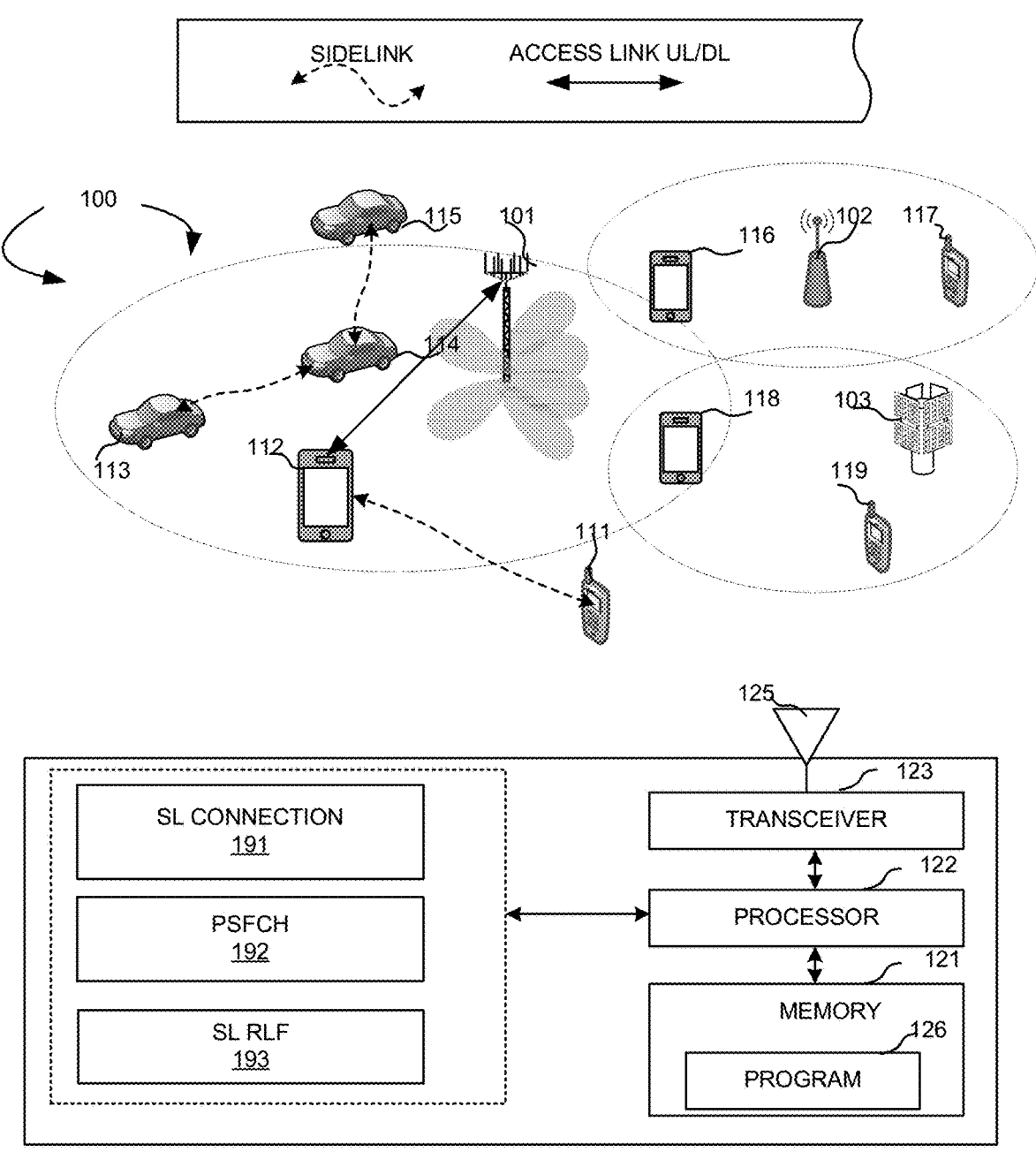
FIG. 1 illustrates a schematic system diagram illustrating an exemplary wireless network for sidelink data communication in unlicensed frequency bands in accordance with embodiments of the current invention.

FIG. 1 illustrates a schematic system diagram illustrating an exemplary wireless network for sidelink data communication in unlicensed frequency bands in accordance with embodiments of the current invention. Wireless network 100 includes multiple communication devices or mobile stations, such as user equipment (UEs) 111, 112, 113, 114, and 115, which are configured with sidelink in unlicensed frequency bands. The exemplary mobile devices in wireless network 100 have sidelink capabilities. Sidelink communications refer to the direct communications between terminal nodes or UEs without the data going through the network. For example, UE 113 communicates with UE 114 directly without going through links with the network units. The scope of sidelink transmission also supports UE-to-network relay to extend the service range of an eNB/gNB, where the inter-coverage UE acts as the relay node between an eNB/gNB and an out-of-coverage UE. For example, UE 112 is connected with base station 101 through an access link. UE 112 provides network access for out-of-coverage UE 111 through sidelink relay. The base station, such as base station 101, may also be referred to as an access point, an access terminal, a base station, a Node-B, an eNode-B (eNB), a gNB, or by other terminology used in the art. The network can be a homogeneous network or heterogeneous network, which can be deployed with the same frequency or different frequencies. Base station 101 is an exemplary base station. With the demands for more capacity and the development of sidelink communication, it is important for the sidelink devices to use the unlicensed frequency bands and be harmoniously coexistence with devices with other RATs operating in the same unlicensed frequency bands. For example, neighboring UEs 116 and 117 communicate with base station 102 through other RATs, such as Wi-Fi, sharing the same unlicensed frequency band. Neighboring UEs 118 and 119 communicate with base station 103 through other RATs, such as NR, sharing the same unlicensed frequency band.

For a sidelink connection, RLF is detected with one or more triggers including 1) the maximum number of retransmissions for a specific destination has been reached; or 2) T400 expiry for a specific destination; or 3) the maximum number of consecutive HARQ discontinuous transmission (DTX) for a specific destination has been reached; or 4) the integrity check failure is indicated from SL PDCP entity. For SL transmitted on unlicensed spectrum (SL-U), the HARQ feedback (i.e., PSFCH) may be blocked due to the failure of LBT channel access, which further has the potential to incorrectly trigger HARQ-based RLF detection using the SL RLF procedures. On the other hand, the results of LBT channel access can also reflect the quality of radio link, which is relevant for RLF detection. Therefore, the mechanisms for the RLF detection of SL-U need some enhancements with the considerations of potential LBT channel access failure to support a stable operation of SL-U. In one novel aspect, the LBT channel access failure based RLF detection is provided for SL-U. For example, if a UE fails to access the channel(s) prior to any, and/or one, and/or multiple, and/or partial, and/or all intended/granted/scheduled/overbooked resource(s), Layer-1 notifies higher layers about the LBT channel access failure. Additionally, the RLF should be declared due to constant LBT channel access failures. The maximum count/number of LBT failure instance(s), and/or the size of the LBT failure detection timer before triggering the consistent LBT channel access failures can be (pre)configured and/or dynamically indicated based on, such as the network loading, and/or network density, and/or channel busy ratio, and/or traffic QoS, and/or the role of the UE (e.g., supervising/anchor/cluster-header UE or supervised/client/cluster-member UE), and/or RLF detection frequency, etc.

In another novel aspect, considering that HARQ DTX caused by LBT failure may incorrectly trigger the HARQ-based RLF, enhanced mechanisms for HARQ-based RLF detection are provided. For example, multiple (consecutive) PSFCH (i.e., HARQ) reception occasions, and/or PSFCH reception occasion window associated with one PSSCH can be (pre)configured and/or dynamically indicated by the channel occupancy time (COT) initiator. The UE can be (pre)configured that increment the number of consecutive DTX by 1 if PSFCH reception(s) is(are) absent on any, and/or one, and/or multiple, and/or partial, and/or all (candidate) PSFCH reception occasion(s) associated to the PSSCH transmission. Additionally, more and/or larger values of the maximum number of consecutive DTX before triggering SL-U RLF can be (pre-)configured and/or dynamically indicated based on, such as the network loading, and/or network density, and/or channel busy ratio, and/or traffic QoS, and/or RLF detection ratio, etc. The (pre)configuration and/or indication can be signaled via SIB and/or (PC5-)RRC, and/or (PC5)-MAC CE, and/or DCI, and/or SCI.

FIG. 1 further illustrates simplified block diagrams of a mobile device/UE for operating in the unlicensed frequency band. UE 111 has an antenna 125, which transmits and receives radio signals. An RF transceiver circuit 123, coupled with the antenna, receives RF signals from antenna 125, converts them to baseband signals, and sends them to processor 122. In one embodiment, the RF transceiver may comprise two RF modules (not shown). RF transceiver 123 also converts received baseband signals from processor 122, converts them to RF signals, and sends out to antenna 125. Processor 122 processes the received baseband signals and invokes different functional modules to perform features in UE 111. Memory (or storage medium or computer-readable medium) 121 stores program instructions and data 126 to control the operations of UE 111. Antenna 125 sends uplink transmission and receives downlink transmissions to/from base stations.

UE 111 also includes a set of control modules that carry out functional tasks. UE 111 may only include a subset of the control modules to perform one or more functional tasks. These control modules can be implemented by circuits, software, firmware, or a combination of them. A SL connection module 191 establishes an SL connection on unlicensed frequency bands (SL-U) for an SL-U transceiving on a physical sidelink shared channel (PSSCH) in a wireless network, wherein the SL transceiving is configured with one or more resource block (RB) sets of an SL bandwidth part (BWP). A PSFCH module 192 configures one or more candidate PSFCH occasions to be associated with the PSCCH. An SL RLF module 193 determines an SL radio link failure (RLF) for the SL connection based on at least one detection procedures comprising a hybrid automatic repeat request (HARQ) based SL-U RLF procedure and a listen-before-talk (LBT) based RLF procedure.

Figures 2, 3:
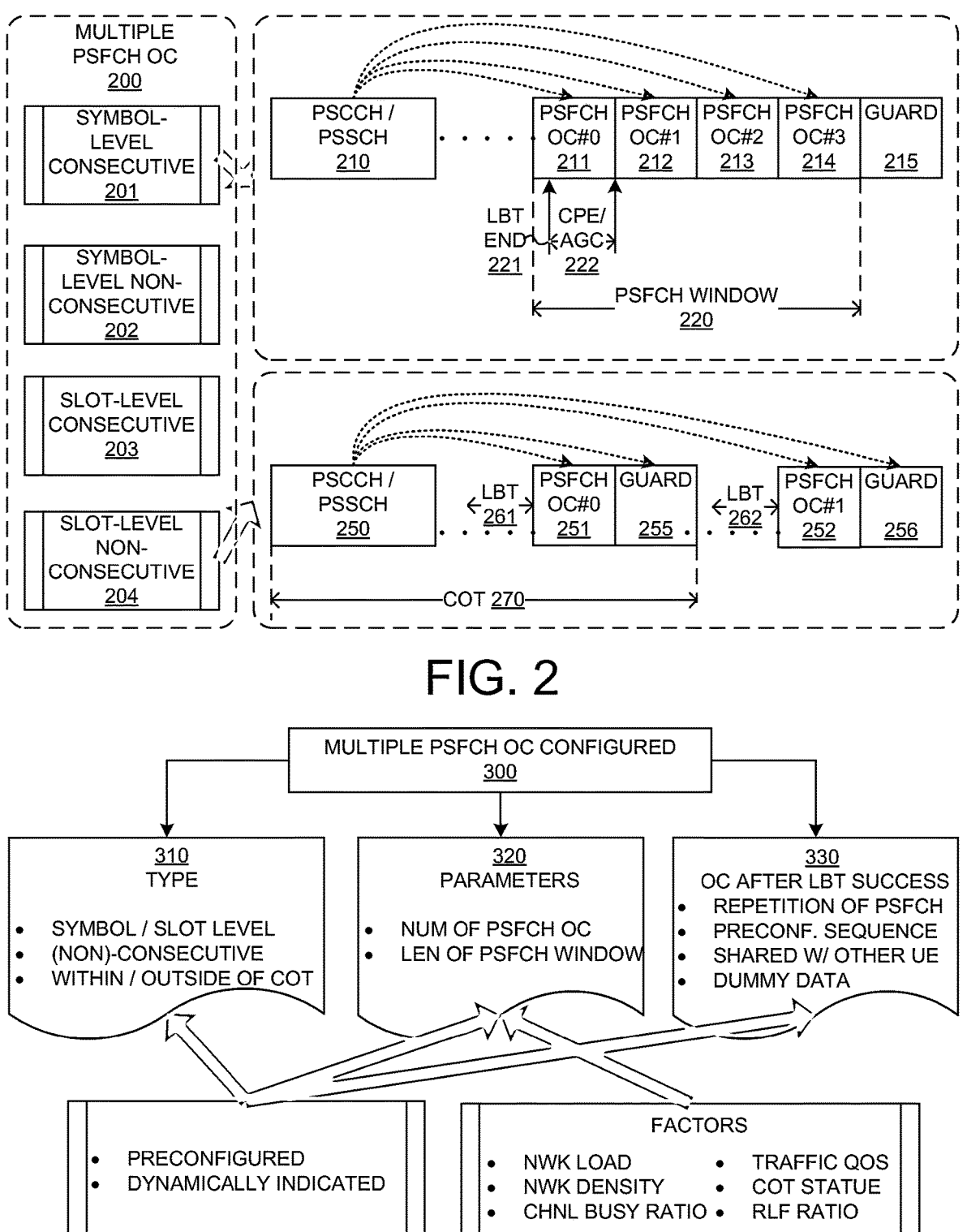
FIG. 2 illustrates exemplary diagrams configuring multiple PSFCH occasions for PSSCH/PSCCH for SL transceiving in the SL-U in accordance with embodiments of the current invention.
FIG. 3 illustrates exemplary diagrams for performing multiple PSFCH occasions procedure with types, parameters and factors for SL transceiving in the SL-U in accordance with embodiments of the current invention.

FIG. 2 illustrates exemplary diagrams configuring multiple PSFCH occasions for PSSCH/PSCCH for SL transceiving in the SL-U in accordance with embodiments of the current invention. In one novel aspect (200), multiple candidate PSFCH reception occasions associated with one PSSCH are preconfigured and/or dynamically indicated. In one embodiment 201, the multiple PSFCH occasions are (pre)configured at consecutive symbol level. In embodiment 202, the multiple PSFCH occasions are (pre)configured at non-consecutive symbol level. In embodiment 203, the multiple PSFCH occasions are (pre)configured at consecutive slot level. In embodiment 204, the multiple PSFCH occasions are (pre)configured at non-consecutive symbol level. An example of consecutive symbol-level multiple PSFCH occasions is illustrated. PSCCH/PSSCH 210 is configured to be associated with consecutive multiple PSFCH occasions 211, 212, 213, and 214 at symbol-level. PSFCH occasions 211-214 are consecutive symbols within a PSFCH window 220. A guard symbol 215 follows the consecutive PSFCH occasions. As an example, to transmit the PSFCH, an LBT is performed. At step 221, the LBT succeeded at the symbol configured for PSFCH occasion #0 211. In one embodiment, AGC/CPE is transmitted between the LBT success and the starting symbol of the next PSFCH occasion, which is PSFCH occasion #1 212. Another example of slot-level non-consecutive PSFCH occasions is illustrated. PSCCH/PSSCH 250 is configured to be associated with PSFCH occasion #0 251 and PSFCH occasion #1 252. PSFCH occasion #0 251 and PSFCH occasion #1 252 are both at slot level. As an example, each is followed by a guard slot 255 and 256, respectively. As an example, PSFCH occasion #0 251 is within COT 270 of PSCCH/PSSCH 250. In one embodiment, a LBT 261 is performed within the COT before transmission of the PSFCH. PSFCH occasion #1 252 is outside of the COT. An LBT 262 is performed before the transmission of the PSFCH. Other configurations of symbol level non-consecutive PSFCH occasions and slot level consecutive PSFCH occasions can be similarly configured. For the case that the candidate PSFCH reception occasion(s) and/or PSFCH reception window(s) are (pre-)configured and/or indicated at the discontinuous symbol(s), and/or within different slots, and/or within different COT, the AGC symbol may be (pre-)configured for each PSFCH transmission. For example, two PSFCH occasion windows, each comprised of two PSFCH occasions, are (pre-)configured within two (consecutive) slots, respectively, for one PSSCH. The first and/or partial PSFCH occasion after LBT channel access is finished within each PSFCH occasion window may be used for AGC purpose (such as CPE/AGC 222). The following PSFCH occasion(s) within each PSFCH window may be used for PSFCH transmission. In this case, the LBT before each PSFCH window (such as LBT 261 and 262) may be independent.

FIG. 3 illustrates exemplary diagrams for performing multiple PSFCH occasions procedure with types, parameters and factors for SL transceiving in the SL-U in accordance with embodiments of the current invention. In one novel aspect 300, multiple PSFCH occasions are configured to be associated with one PSCCH/PSSCH. In one aspect 310, PSFCH reception occasions and/or a PSFCH reception occasion window can be configured to be within one slot and/or span multiple consecutive or non-consecutive slots. PSFCH reception occasions and/or a PSFCH reception occasion window can be configured to be within COT and/or out-of-COT of the associated PSSCH. In one aspect 320, one or mor parameters can be preconfigured or dynamically indicated. The one or more parameters includes the number of candidate PSFCH reception occasions, and the length of the PSFCH reception occasion window associated with one PSSCH/PSCCH. These parameters 320 and the configuration type 310 are determined based on one or more factors including the network loading, network density, channel busy ratio, traffic QoS, within or out of COT statue, and RLF detection ratio (within a duration). In one embodiment 330, the transmission on the first PSFCH occasion/symbol immediately after LBT channel access is finished can be used for AGC purpose for the following PSFCH(s) and/or a CPE operation as (pre-)configuration. After a successful PSFCH transmission, the transmission(s) on the remaining PSFCH candidate occasion(s)/symbol(s) can be (pre)configured. For example, it can be (pre)configured to transmit one or more types of traffic including the repetition of the PSFCH, a (per)configured sequence, and (dummy) data on the remaining candidate PSFCH occasion(s)/symbol(s). Alternatively, the remaining one or more candidate PSFCH occasions after a successful PSFCH transmission can be shared to the other UE(s) as (pre-) configuration.

Figure 4:
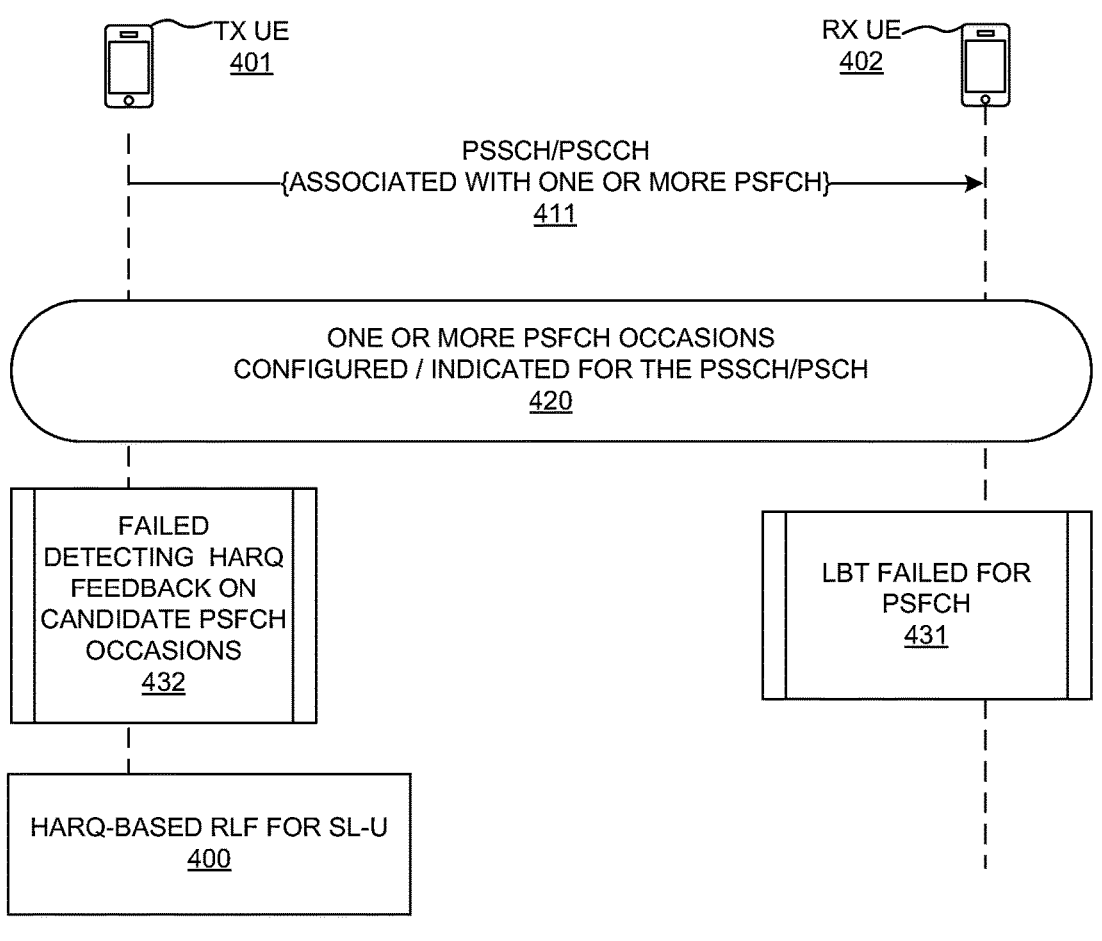
FIG. 4 illustrates exemplary diagrams for top-level HARQ-based RLF procedure for SL transceiving in SL-U in accordance with embodiments of the current invention.

FIG. 4 illustrates exemplary diagrams for top-level HARQ-based RLF procedure for SL transceiving in SL-U in accordance with embodiments of the current invention. In one novel aspect, the HARQ-based RLF detection is supported for SL-U. Specifically, if the maximum number of consecutive HARQ DTX (for a specific destination) is reached, the UE shall declare RLF and the cause of the RLF should be identified as consecutive DTX. For SL-U, the LBT failure may block the transmission of HARQ (i.e., PSFCH) and thus may incorrectly trigger the HARQ-based RLF detection. Therefore, some enhanced mechanisms for HARQ-based RLF detection of SL-U are proposed.

As an example, a TX UE 401 performs SL transceiving with RX UE 402 on SL-U. At step 411, TX UE 401 transmits the PSSCH/PSCCH to RX UE 402. The PSSCH/PSCCH is configured to be associated with one or more PSFCH occasions. In one embodiment 420, both the TX UE 401 and RX UE 402 are preconfigured or dynamically indicated for the one or more associated PSFCH occasions. RX UE 402 attempts to send HARQ via the configured PSFCH to TX UE 401. At step 431, the LBT before the transmission of PSFCH by RX UE 402 failed. At step 432, TX UE 401 detects the missing of HARQ feedback from RX UE 402 on the candidate PSFCH occasions. At step 400, TX UE performs HARQ-based RLF procedure for the SL transceiving on SL-U. The UE HARQ entity for PSFCH reception occasion(s) associated to the PSSCH transmission performs HARQ RLF procedure. If one or more PSFCH receptions are absent at one or more (candidate) PSFCH reception occasion(s): increase the number of consecutive DTX by 1. If the number of the consecutive DTX reaches the max number of consecutive DTX: the procedure indicates HARQ-based RLF detection to RRC. Otherwise, the HARQ-RLF procedure re-initializes the number of consecutive DTX to zero.

Figure 5:
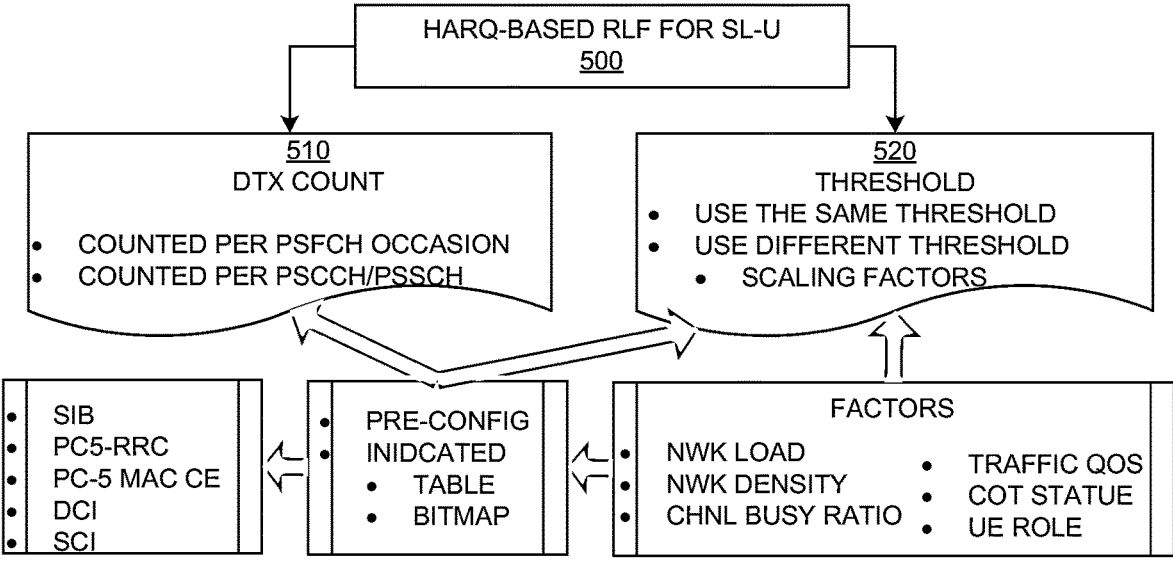
FIG. 5 illustrates exemplary diagrams for detailed HARQ-based RLF procedure with configuration, threshold and factors in accordance with embodiments of the current invention.

FIG. 5 illustrates exemplary diagrams for detailed HARQ-based RLF procedure with configuration, threshold, and factors in accordance with embodiments of the current invention. In one embodiment 500, UE performs HARQ-based RLF procedure for the SL transceiving on SL-U. In one aspect 510, DTX count is configured for the SL-U. In one embodiment, HARQ based SL-U RLF procedure increases DTX for each PSSCH or physical sidelink control channel (PSCCH) and disregards detected DTX on PSFCH. In another embodiment, the HARQ based SL-U RLF procedure increases DTX for each PSFCH absence. In one aspect 520, DTX thresholds are configured based on the DTX count configuration. In one embodiment, the same DTX threshold is used for the SL-U as other SL transceiving. In this case, the DTX count is configured to be per PSCCH/PSSCH. In one embodiment, a DTX threshold value is modified, wherein the DTX threshold value is a maximum number that consecutive numbers of DTX detected before triggering the SL RLF. The values of the maximum number of consecutive DTX before triggering SL-U RLF can be (pre)configured based on one or more impact factors including network loading, network density, channel busy ratio, traffic QoS, the role of the UE (e.g., supervising/anchor UE, or supervised/client UE), the purpose of the COT (e.g., used by the COT initiator, or shared to other UEs), the UE member in the group, and within or out of COT statue. In one embodiment, when the DTX threshold is modified, the UE can be configured with a scaling factor with reference to a legacy DTX threshold. For example, for lower network loading, a smaller scaling factor can be multiplied with the original maximum consecutive DTX number. For higher network loading, a larger scaling factor can be multiplied with the original maximum consecutive DTX number. Additionally, A UE can be (pre) configured and/or indicated with a new maximum number of consecutive DTX wherein more and/or larger values are included. In one embodiment, the DTX count configuration, the DTX threshold configuration can be preconfigured or dynamically indicated. In one embodiment, a bitmap and/or a table and/or a scaling factor can be (pre-)configured to indicate the relation between the value of the maximum number of consecutive DTX and the impact factor. In one embodiment, the configuration or dynamic indication of the DTX threshold value is signaled through one or more signaling comprising system information block (SIB), PC5 radio resource control (RRC), PC-5 MAC control element (CE), downlink control indicator (DCI), and sidelink control indicator (SCI).

Figures 6, 7:
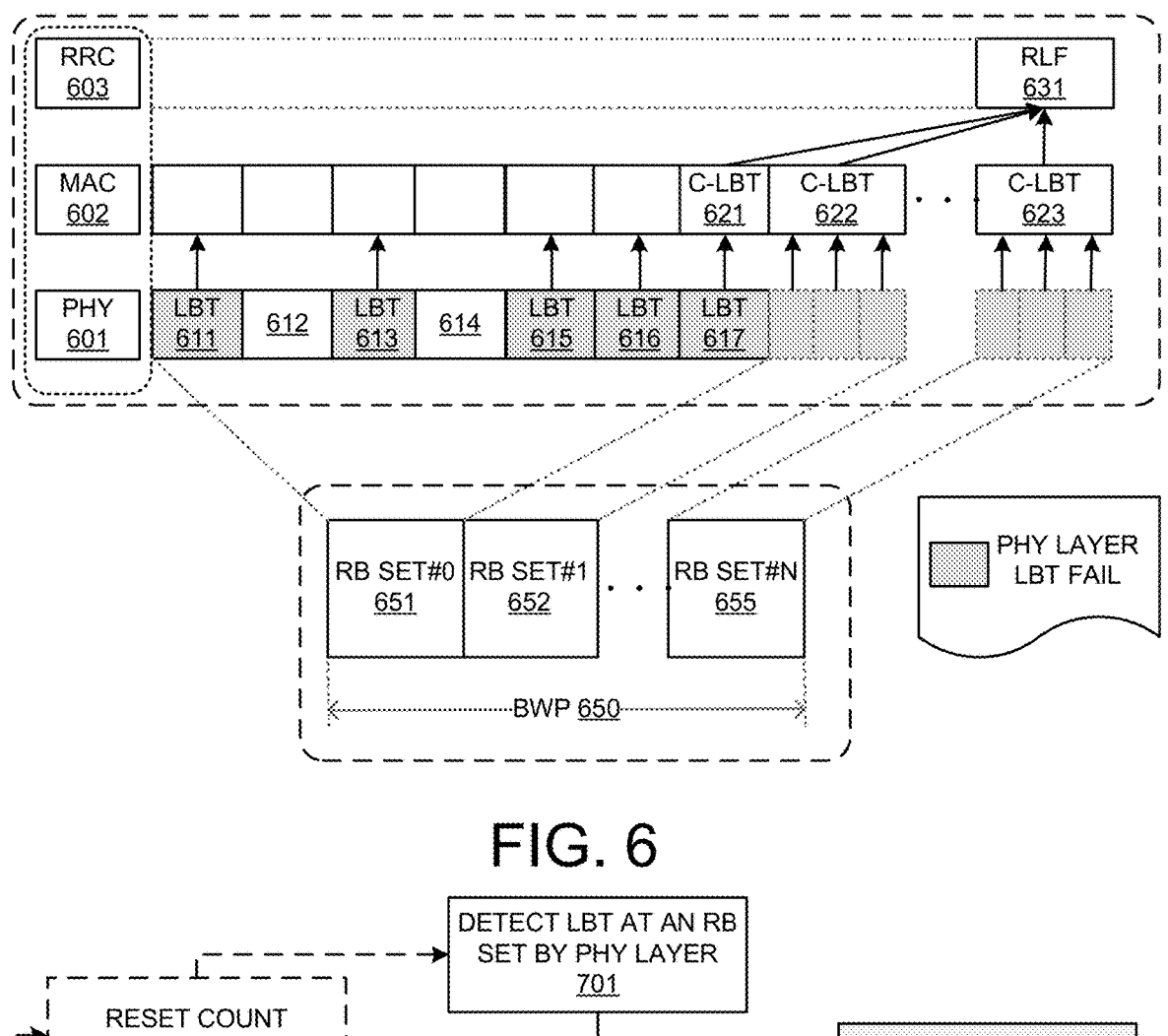
FIG. 6 illustrates exemplary diagrams for top-level LBT-based RLF procedure for SL transceiving in SL-U in accordance with embodiments of the current invention.
FIG. 7 illustrates an exemplary flow diagram for LBT-based RLF procedure for SL transceiving in SL-U in accordance with embodiments of the current invention.

FIG. 6 illustrates exemplary diagrams for top-level LBT-based RLF procedure for SL transceiving in SL-U in accordance with embodiments of the current invention. In one novel aspect, LBT channel access failure based RLF (or LBT-based RLF) detection is provided for SL-U. For example, if a UE fails to access the channel(s) prior to an, and/or multiple intended transmission(s), Layer-1 (PHY) notifies higher layers about the LBT channel access failure. Alternatively, when lower layer performs an LBT procedure before a and/or multiple transmission(s) and the transmission(s) is(are) not performed, an LBT failure indication shall be sent to the MAC entity from lower layers. For the case that additional and/or multiple resources are allocated/ scheduled/overbooked for one (TB) transmission, and/or for the case that additional and/or multiple PSFCH reception occasions associated with PSSCH transmission are (pre-) configured and/or indicated, and/or for the case that additional and/or multiple candidate S-SSB occasions are (pre-) configured and/or indicated, L1 can be (pre-)configured to report LBT channel access failure to higher layers if the UE fails to access the channel(s) prior to any, and/or one, and/or multiple, and/or partial, and/or all intended resource(s)/ occasion(s).

The RLF shall be declared by the UE if consistent LBT failures occurred, and the cause of the RLF can be set as LBT failure as (pre-)configuration. As illustrated, the UE has exemplary protocol layers of PHY 601, MAC 602, and RRC 603. The UE is configured with multiple exemplary RB sets for BWP 650, including RB set #0 651, RB set #1 652, and RB set #N 655. As an example, for RB set #0 651, PHY detects LBT failure at 611, 613, 615, 616 and 617. As LBT failure 611 and 613 are not consecutive, the LBT failure was reset. When PHY detects consecutive LBT failure at 615, 616 and 617, PHY reported a consecutive LBT failure (C-LBT) 621 for RB set #0 651. When C-LBT 622 is determined by the MAC layer due to consecutive LBT failure for RB set #1 652, the C-LBT 622 is reported to RRC layer. Similarly, C-LBT 623 is reported to the RRC layer when consecutive LBT failure for RB set #1 652 is detected by the PHY layer. RRC layer declares RLF (631) when all the RB sets for the SL connections are detected C-LBT. In one embodiment, RRC can configure parameter(s) in the procedures of consistent LBT failures indication. For example, the RRC parameters to indicate the maximum count/number of LBT failure instance (e.g., lbt-FailureIn-stanceMaxCount), and/or the detection timer of LBT failure (e.g., lbt-FailureDetectionTimer) can be (pre-)configured for the consistent LBT failure detection. Besides, a counter for LBT failure indication can be used for the consistent LBT failure detection procedure (e.g., LBT COUNTER).

In one embodiment, the value/size of the maximum count/number of LBT failure instance, and/or the detection timer of LBT failure are (pre)configured and/or dynamically indicated based on one or more factors. In one embodiment, the one or more factors include network loading, network density, channel busy ratio, traffic QoS, the role of the UE (e.g., supervising/anchor UE, or supervised/client UE), the purpose of the COT (e.g., used by the COT initiator, or shared to other UEs), the UE member in the group, within or out of COT statue, RLF detection frequency/ratio, etc. A bitmap, and/or a table, and/or a scaling factor can be (pre)configured and/or indicated to reflect the relation between the value/size of the maximum count/number of LBT failure instance, and/or the LBT failure detection timer with the impact factors.

In another embodiment, based on the consistent LBT failure indication frequency/times/ratio, and/or the LBT based RLF detection frequency/times/ratio, some RLF recovery mechanisms are implemented as (pre-)configuration. For example, LBT based RLF parameters, and/or enhanced resource selection mechanisms are dynamically updated or configured for the UE. For example, when the LBT based RLF detection ratio (in a duration/period) exceeds threshold(s), larger maximum count of LBT failure instance, and/or larger detection timer of LBT failure applies as (pre)configured and/or dynamically indicated. Besides, the enhanced resource selection mechanisms are (pre-)configured and/or indicated based on the RLF detection ratio. For example, based on the relation between the RLF frequency/times/ratio and one or more (pre)configured or dynamically indicated threshold(s) , one or more procedures are performed. The one or more procedures includes more overbooked resources associated with one TB, more candidate PSFCH occasions associated with one PSSCH, finer channel access granularity, longer LBT protection margin between LBT channel access and resource selection, etc.

FIG. 7 illustrates an exemplary flow diagram for LBT-based RLF procedure for SL transceiving in SL-U in accordance with embodiments of the current invention. In one embodiment, the consistent LBT failure can be triggered based on the relation between LBT COUNTER and the parameters of lbt-FailureInstanceMaxCount and lbt-Failure-DetectionTimer. For example, if LBT failure indication has been received from lower layers: start or restart the lbt-FailureDetectionTimer and increment LBT COUNTER by 1. Then if LBT COUNTER>=lbt-FailureInstanceMaxCount: trigger consistent LBT failure. If all triggered consistent LBT failure are cancelled; or if the lbt-FailureDetection-Timer expires; or if lbt-FailureDetectionTimer or lbt-Fail-ureInstanceMaxCount is reconfigured by upper layer: set LBT COUNTER to 0.

As illustrated, at step 701, PHY layer detects an LBT failure at an RB set. At step 702, the PHY layer reports the LBT failure to the MAC layer. At step 721, the UE determines if the MAX LBT failure is reach for C-LBT. If step 721 determines yes, the UE moves to step 722, and checks if the LBT-RLF timer expires. If step 722 determines yes, the UE, at step 711, resets the LBT failure counter and moves back to step 701. If step 722 determines no, the UE, at step 730, determines C-LBT at the MAC layer for the RB set and sends the C-LBT for the RB set to the RRC layer. At step 731, the UE determines if all RB sets are determined to be C-LBT. If step 731 determines no, the UE determines if the timer expires. If yes, the UE moves to step 711 to reset the LBT failure counter. If step 731 determines yes, the UE moves to step 700 and determines RLF.

FIG. 8 illustrates an exemplary flow chart for the determining SL RLF for SL transceiving on SL-U with HARQ-based RLF procedure and/or LBT-based procedure in accordance with embodiments of the current invention. At step 801, the UE establishes a sidelink (SL) connection on unlicensed frequency bands (SL-U) for an SL-U transceiving on a physical sidelink shared channel (PSSCH) in a wireless network, wherein the SL transceiving is configured with one or more resource block (RB) sets of an SL bandwidth part (BWP). At step 802, the UE configures one or more candidate physical sidelink feedback channel (PSFCH) occasions to be associated with the PSCCH. At step 803, the UE determines an SL radio link failure (RLF) for the SL connection based on at least one detection procedures comprising a hybrid automatic repeat request (HARQ) based SL-U RLF procedure and a listen-before-talk (LBT) based RLF procedure.

FIG. 9 illustrates an exemplary flow chart for configuring multiple PSFCH occasions for PSSCH/PSCCH for SL transceiving on SL-U in accordance with embodiments of the current invention. At step 901, the UE establishes a sidelink (SL) connection on unlicensed frequency bands (SL-U) for an SL-U transceiving on a physical sidelink shared channel (PSSCH) in a wireless network. At step 902, the UE configures multiple candidate physical sidelink feedback channel (PSFCH) occasions to be associated with the PSCCH. At step 903, the UE performs the SL transceiving on the PSSCH with the multiple associated PSFCH.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for a user equipment (UE), comprising:

establishing, by the UE, sidelink (SL) connections on unlicensed frequency bands (SL-U) for an SL-U transceiving on one physical sidelink control channel (PSCCH)/physical sidelink shared channel (PSSCH) in a wireless network, wherein the SL transceiving is configured with one or more resource block (RB) sets of an SL bandwidth part (BWP);

configuring one or more candidate physical sidelink feedback channel (PSFCH) occasions to be associated with the one PSCCH/PSSCH;

determining an SL radio link failure (RLF) for the SL connections based on at least one detection procedures comprising a hybrid automatic repeat request (HARQ) based SL-U RLF detection procedure and a listen-before-talk (LBT) failure based RLF detection procedure, the HARQ based SL-U RLF detection procedure increases DTX by 1 for each PSCCH/PSSCH transmission when all associated candidate PSFCH receptions are absent on candidate PSFCH reception occasions, and wherein the LBT based RLF procedure comprising: detecting, by a PHY layer of the UE, an LBT failure for an RB set; reporting the LBT failure of the RB set to a MAC layer of the UE; determining a consistent LBT (C-LBT) for the RB set based on a C-LBT threshold; and determining an RLF for the SL connections when all configured RB sets for the SL connections are determined to be C-LBT.

2. The method of claim 1, wherein a DTX threshold value is modified, and wherein the DTX threshold value is a maximum number of consecutive DTX before triggering the SL RLF of a SL connection.

3. The method of claim 2, wherein the DTX threshold value is modified through pre-configuration or dynamic indication.

4. The method of claim 3, wherein the DTX threshold is modified based on one or more factors comprising network loading, network density, channel busy ratio, and traffic quality of service (QoS).

5. The method of claim 3, wherein the pre-configuration or dynamic indication of the DTX threshold value is signaled through one or more signaling comprising system information block (SIB), PC5 radio resource control (RRC), PC-5 MAC control element (CE), downlink control indicator (DCI), and sidelink control indicator (SCI).

6. The method of claim 1, wherein a cause of the determined RLF is set to be LBT failure.

7. The method of claim 1, wherein the C-LBT threshold is preconfigured or dynamically indicated.

8. The method of claim 7, wherein the C-LBT threshold is based on one or more factors comprising network loading, network density, channel busy ratio, and traffic quality of service (QoS), UE's supervising role, and UE member in a UE group.

9. The method of claim 1, wherein the one or more PSFCH occasions are consecutive.

10. The method of claim 1, wherein the one or more PSFCH occasions are non-consecutive.

11. The method of claim 1, wherein at least one PSFCH occasion of the one or more PSFCH occasions is configured at symbol level.

12. The method of claim 1, wherein at least one PSFCH occasion of the one or more PSFCH occasions is configured at slot level.

13. The method of claim 1, wherein the one or more PSFCH occasions are preconfigured or dynamically indicated.

14. A user equipment (UE), comprising:

a transceiver that transmits and receives radio frequency (RF) signal in a wireless network;

a memory; and a processor coupled to the memory, the processor configured to establish an SL connection on unlicensed frequency bands (SL-U) for an SL-U transceiving on one physical sidelink control channel (PSCCH)/physical sidelink shared channel (PSSCH) in a wireless network, wherein the SL transceiving is configured with one or more resource block (RB) sets of an SL bandwidth part (BWP);

configure one or more candidate physical sidelink feedback channel (PSFCH) occasions to be associated with the PSCCH/PSSCH;

determine an SL radio link failure (RLF) for the SL connections based on at least one detection procedures comprising a hybrid automatic repeat request (HARQ) based SL-U RLF detection procedure and a listen-before-talk (LBT) failure based RLF detection procedure, the HARQ based SL-U RLF detection procedure increases DTX by 1 for each PSCCH/PSSCH transmission when all associated candidate PSFCH receptions are absent on candidate PSFCH reception occasions, and wherein the LBT based RLF procedure comprising: detecting, by a PHY layer of the UE, an LBT failure for an RB set; reporting the LBT failure of the RB set to a MAC layer of the UE; determining a consistent LBT (C-LBT) for the RB set based on a C-LBT threshold; and determining an RLF for the SL connections when all configured RB sets for the SL connections are determined to be C-LBT.

* * * * *